United States Patent [19]
Kluttz et al.

[11] Patent Number: 6,120,913
[45] Date of Patent: Sep. 19, 2000

[54] BITUMINOUS COMPOSITION FOR SHINGLES

[75] Inventors: Robert Quillin Kluttz, Houston, Tex.; Gerardus Wilhelmus Jozef Heimerikx, Amsterdam, Netherlands

[73] Assignee: Shell Oil Company, Houston, Tex.

[21] Appl. No.: 09/065,259

[22] Filed: Apr. 23, 1998

[51] Int. Cl.[7] ............................. B32B 11/00; B32B 11/02
[52] U.S. Cl. ........................... 428/521; 428/523; 524/71; 524/401
[58] Field of Search ................. 524/59, 71, 401; 428/521, 523

[56] References Cited

U.S. PATENT DOCUMENTS

| | | | |
|---|---|---|---|
| 4,129,541 | 12/1978 | Marrs et al. | 524/71 |
| 4,405,680 | 9/1983 | Hansen | 428/285 |
| 4,530,652 | 7/1985 | Buck et al. | 442/86 |
| 4,588,634 | 5/1986 | Pagen et al. | 428/283 |
| 5,272,214 | 12/1993 | Custro et al. | 525/314 |
| 5,366,779 | 11/1994 | Thompson | 428/96 |
| 5,486,574 | 1/1996 | Himes et al. | 525/314 |
| 5,743,985 | 4/1998 | Ernest et al. | 156/243 |
| 5,854,335 | 12/1998 | Heimerikx et al. | 524/571 |
| 5,965,257 | 10/1999 | Ahluwalia | 428/357 |
| 6,025,032 | 2/2000 | Gaveske | 427/393.6 |

FOREIGN PATENT DOCUMENTS

| | | |
|---|---|---|
| 0006674 | 1/1980 | European Pat. Off. |
| 0641834 | 3/1995 | European Pat. Off. |
| 2307018 | 11/1976 | France |
| 61-076539 | 4/1986 | Japan |
| WO 86/06736 | 11/1986 | WIPO |

OTHER PUBLICATIONS

Tanaka, Y., et al., "Sequence Distribution of Commercial SBR By Ozonolysis–GPC Measurement", Rubber Chemistry And Technology, vol. 59, pp. 16–26 (1985).

*Primary Examiner*—Jeffrey C. Mullis
*Attorney, Agent, or Firm*—Donald F. Haas

[57] ABSTRACT

The present invention provides a roofing shingle which is comprised of a support material and a bituminous composition which comprises a bitumen component, less than 15% by weight of a block copolymer composition, based on total weight of block copolymer composition and bitumen component, and more than 40% by weight of a filler, based on total weight of block copolymer, bitumen component and filler, which block copolymer composition comprises at least one block of a conjugated diene and at least two blocks of a monovinylaromatic hydrocarbon, wherein the block copolymer composition has a vinyl content of at least 25% by weight based on the total diene content and optionally a diblock content of 25 wt % or less, and any diblock copolymer present has an apparent molecular weight which is in the range of from 60,000 to 170,000.

10 Claims, No Drawings

BITUMINOUS COMPOSITION FOR SHINGLES

FIELD OF THE INVENTION

The present invention relates to a bituminous composition. In particular, the present invention relates to a bituminous composition for use in roofing shingles.

BACKGROUND OF THE INVENTION

Bituminous compositions for use in roofing materials such as roll roofing products are known in the art. It is desirable to use styrene-butadiene-styrene (SBS) block copolymer-modified asphalt in the manufacture of shingles for many of the same reasons that SBS modified roll roofing products are desirable. They have improved wind resistance, impact resistance, and tear resistance. They are more resistant to cracking at low temperature. They are more flexible, so they are less susceptible to long term damage from thermal cycling.

There are added challenges in the manufacture of SBS modified shingles above and beyond the normal challenges experienced in the manufacture of SBS modified roll roofing products. In order to achieve suitable slump resistance, suitable fire resistance, and moderate raw material costs, shingle asphalt formulations contain 60% or more filler, where flame retardants may replace part of the filler. At these high filler loadings, the viscosity of the asphalt increases rapidly.

Conventional shingles are manufactured on high speed lines running up to 600 feet per minute. They typically consist of an organic or fiberglass felt coated with oxidized asphalt which contains a high loading of filler. In order to have sufficiently low viscosity to run at high speeds, shingle lines typically operate at higher temperatures than roll roofing lines, typically greater than 400° F. Modification of asphalt with conventional SBS polymers causes a very large increase in viscosity. This high viscosity combined with the viscosity increase from the filler content makes SBS modified asphalt extremely difficult to process in shingle applications. Thus it is desirable to have SBS modified asphalt formulations which maintain suitable physical properties in the final product but have reduced viscosity to facilitate processing.

SUMMARY OF THE INVENTION

Accordingly, the present invention provides a roofing shingle comprised of a support material, usually referred to as a carrier or reinforcement, which preferably is an organic or fiberglass mat or felt, and a bituminous composition which comprises a bitumen component, less than 15% by weight of a block copolymer composition, based on total weight of block copolymer composition and bitumen component, and more than 40% by weight of a filler, based on total weight of the bitumen component, block copolymer composition, and filler, which block copolymer composition comprises at least one block of conjugated diene and at least two blocks of a monovinylaromatic hydrocarbon, wherein the block copolymer composition has a vinyl content of at least 25% by weight based on the total diene content and optionally a diblock content of 25 by weight (wt %) or less, and any diblock copolymer present has an apparent molecular weight which is in the range of from 60,000 to 170,000.

With the term "apparent molecular weight" as used throughout the specification is meant the molecular weight of a polymer, as measured with gel permeation chromatography (GPC) using polystyrene calibration standards (according to ASTM D 3536).

By "diblock content", there should be understood the amount of non-coupled diblock copolymer that is finally present in the prepared block copolymer composition. Where the block copolymer is prepared via the full sequential preparation method, normally only triblock copolymers are formed. The triblock copolymers typically have an apparent molecular weight in the range from 120,000 to 340,000. The diblock content is preferably less than 20% wt, more preferably 15 wt % or less.

DETAILED DESCRIPTION OF THE INVENTION

We have discovered that high vinyl content vinyl aromatic hydrocarbon-conjugated diene-vinyl aromatic hydrocarbon (especially, SBS) polymers give inherently lower viscosity than conventional polymers of the same molecular architecture and molecular weight in identical formulations. This difference is enhanced at high filler loadings. In addition high vinyl SBS polymers give better high temperature properties than conventional SBS polymers of the same molecular architecture and molecular weight in identical formulations. Conversely, the same high temperature properties as a conventional formulation may be achieved using a high vinyl SBS polymer at lower concentration. This effect is also enhanced at high filler loadings. This combination of effects allows the preparation of SBS modified asphalt formulations suitable for the manufacture of SBS modified shingles with dramatically lower processing viscosity than that of a formulation made with conventional SBS polymers.

The block copolymer composition constituents may be either linear or radial; good results have been obtained with both copolymer types. The block copolymer composition constituents include linear triblock copolymers (ABA), multi-armed block copolymers ((AB)$_n$X) and diblock copolymers (AB), with A representing a monovinyl aromatic hydrocarbon polymer block, B representing a conjugated diene polymer block, n being an integer of 2 or higher, preferably from 2 to 6 and X representing the residue of a coupling agent. The coupling agent may be any di- or polyfunctional coupling agent known in the art, for example, dibromoethane, silicon tetrachloride, diethyl adipate, divinylbenzene, dimethyldichlorosilane, methyl dichlorosilane. Particularly preferred in such a preparation route is the use of non-halogen containing coupling agents, for example gamma- glycidoxypropyl-trimethoxysilane and diglycidylether of bisphenol A.

The block copolymers, which are useful as modifiers in the bituminous compositions according to the present invention, may be prepared by any method known in the art including the well known full sequential polymerisation method, optionally in combination with reinitiation, and the coupling method, as illustrated in e.g. U.S. Pat. Nos. 3,231,635; 3,251,905; 3,390,207; 3,598,887 and 4,219,627 and EP 0413294 A2, 0387671 B1, 0636654 A1, WO 94/22931, which are herein incorporated by reference. The block copolymer may therefore, for example, be prepared by coupling at least two diblock copolymer molecules AB together.

Techniques to enhance the vinyl content of the conjugated diene portion are well known and may involve the use of polar compounds such as ethers, amines and other Lewis bases and more in particular those selected from the group consisting of dialkylethers of glycols. Most preferred modifiers are selected from dialkyl ether of ethylene glycol containing the same or different terminal alkoxy groups and optionally bearing an alkyl substituent on the ethylene radical, such as monoglyme, diglyme, diethoxyethane, 1,2- diethoxy-propane, 1-ethoxy-2,2-tert-butoxyethane, of which 1,2-diethoxypropane is most preferred. Monoethers such as diethyl ether and aromatic ethers such as o-dimethoxybenzene may also be used.

The apparent molecular weight of diblock copolymer (AB) is in the range of from 60,000 to 170,000. Preferably, said diblock copolymer apparent molecular weight is in the range of from 60,000 to 130,000, more preferably from 70,000 to 125,000, and most preferably from 115,000 to 125,000.

The content of monovinyl aromatic hydrocarbon of the final block copolymer is suitably in the range of from 10 to 55% by weight, preferably in the range of from 20 to 45% by weight, and more preferably 25 to 40% by weight, based on the total block copolymer. Suitable monovinyl aromatic hydrocarbons include styrene, o-methylstyrene, p-methylstyrene, p-tert-butylstyrene, 2,4-dimethylstyrene, α-methylstyrene, vinylnaphthalene, vinyltoluene and vinylxylene, or mixtures thereof of which styrene is the most preferred.

Suitable conjugated dienes include those having from 4 to 8 carbon atoms, for example 1,3-butadiene, 2-methyl-1,3-butadiene (isoprene), 2,3-dimethyl-1,3-butadiene, 1,3-pentadiene and 1,3-hexadiene. Mixture of such dienes may also be used. Preferred conjugated dienes are 1,3-butadiene and isoprene, with 1,3-butadiene being the most preferred.

The total vinyl content of the block copolymer is at least 25% by weight. Typically, the vinyl content is in the range of from 30 to 80% by weight, preferably from 35 to 65% by weight, more preferably from 35 to 55% by weight, even more preferably from 35 to 50% by weight, and most preferably from 40 to 50% by weight.

It will be appreciated that with the term "vinyl content" actually is meant that a conjugated diene is polymerised via 1,2-addition. Although a pure "vinyl" group is formed only in the case of 1,2 addition polymerisation of 1,3 butadiene, the effects of 1,2 addition polymerisation of other conjugated dienes on the found final properties of the block copolymer and the blends of it with bitumen will be the same.

The bitumen component may be a naturally occurring bitumen or derived from a mineral oil. Also petroleum pitches obtained by a cracking process and coal tar can be used as the bitumen component as well as blends of various bituminous materials. Examples of suitable components include distillation or "straight-run bitumens", precipitation bitumens, e.g. propane bitumens, blown bitumens, e.g. catalytically blown bitumen, and mixtures thereof. Other suitable bituminous components include mixtures of one or more of these bitumens with extenders (fluxes) such as petroleum extracts, e.g. aromatic extracts, distillates or residues, or with oils. Both compatible as well as incompatible bitumens may be used.

Typically, the bitumen component (either "straight-run bitumen" or "fluxed bitumen") is selected from those having a penetration of up to 300 units at 25° C. (as measured by ASTM D 5). Examples of bitumen components preferred for use in SBS modified shingle applications are those having a penetration of from 10 to 300 units at 25° C. More preferably bitumen components having a penetration of from 50 to 200 units at 25° C. are used. This is distinct from preferred bitumen components for conventional, unmodified shingles where the preferred penetration range is below 50 units at 25° C.

The bituminous composition may also, optionally, contain other ingredients such as resins, oils, stabilisers, anti-statics or flame retardants. The content of such and other components may be in the range of from 0 to 10% by weight, based on total bituminous composition. Of course, other block copolymer compositions may also be included in the bituminous composition of the invention. Such block copolymer compositions can for instance be present in an amount of from 0 to 4% by weight, based on total weight of block copolymer composition and the bitumen component.

The bituminous composition may also comprise a wax. Suitable waxes are those having a congealing point of from 50 to 70° C. Suitable amounts of wax are from 0.1 to 75% w, preferably from 5 to 60% w based on the weight of bitumen present in the bituminous composition. Animal, insect, vegetable, synthetic and mineral waxes may be used with those derived from mineral oils being preferred. Examples of mineral oil waxes include bright stock slack wax, medium machine oil slack wax, high melting point waxes and microcrystalline waxes. In the case of slack waxes up to 25% w of oil may be present. Additives to increase the congealing point of the wax may also be present.

The block copolymer composition is present in the bituminous composition in an amount of less than 15% by weight, preferably in the range between 2 and 15% by weight based on total weight of block copolymer composition and the bitumen component. In the bituminous composition, more preferably the block copolymer composition is present in the range from 5 to 15% by weight, even more preferably from 8 to 12% by weight, based on total weight of block copolymer composition and the bitumen component.

Examples of suitable fillers include talc, calcium carbonate, carbon black, fly ash, slate dust, limestone, dolomite and siliceous fillers, such as clay, mica and other sheet silicates. Mixtures of different fillers may be used. Preferably, calcium carbonate is used as filler. The amount of filler is more than 40% by weight, suitably less than 80% by weight, preferably of from 50 to 75% by weight, more preferably of from 60 to 70% by weight, based on total weight of block copolymer composition, bitumen component and filler. Flame retardants could replace part of the filler. The bituminous composition may also be coloured by adding pigments thereto.

If desired, the bituminous composition may further comprise fibres, such as cellulose, glass and rock fibres. Typically, the bituminous composition may contain up to 25% by weight of fibres, based on the total composition.

The roofing shingles of this invention comprise the above-described bituminous composition and support material usually referred to as a carrier or reinforcement. The support material is typically an organic or fiberglass mat or felt. Though not in common use, polyester mats may also be used. The mat or felt is coated with the bituminous composition using conventional technology well known to those skilled in the art. The shingle material may be coated on the top side with granules for UV resistance and aesthetic appeal. The shingle material is often coated on the bottom side with sand or dust to prevent sticking.

Optional components commonly used in roofing shingles may also be used with this improved composition. These include tab sealant adhesive and release strip to prevent wind uplift and laminated compositions which enhance aesthetic appeal. The roofing shingles in this invention are also suitable for use as hip or ridge caps.

The following Examples illustrate the present invention.

Examples 1 and 2 illustrate two formulations, 1 with a conventional SBS polymer and 2 with a high vinyl SBS polymer. Despite the lower polymer content, the formulations have the same softening point. Also, the processing viscosity is nearly two orders of magnitude lower.

| | | | | | Shingle Blend Evaluation | | | | |
|---|---|---|---|---|---|---|---|---|---|
| Polymer type | % polymer in roofing flux | % modified flux | % filler | Ring & Ball, °F. | Penetration 77° F., 5 s, 100 g | RPM | Multiplier | Viscometer Readout | Viscosity @ 400° F., cps |
| D1184 | 10 | 35 | 65 | 279 | 29 | 1 | 20000 | 26.5 | 530,000 a) |
| KX219ES | 8 | 35 | 65 | 279 | 40 | 2.5 | 8000 | 61.8 | 490,000 a) |
| | | | | | | 50 | 400 | 17.9 | 7160 b) |
| | | | | | | 100 | 200 | 31.4 | 6280 b) |

Note:
Viscosity measured by Brookfield Viscometer model HATDV-1 with a # 29 spindle.
Viscosity was calculated using HA Series spindle factor chart.
a) Surface was not flat but slightly raised on the spindle. Blend had putty like appearance and did not flow out of the tube.
b) This blend was fluid with a flat surface and did flow out of the tube.

We claim:

1. A roofing shingle comprised of a support material and a bituminous composition comprising a bitumen component, less than 15% by weight of a block copolymer composition, based on total weight of block copolymer composition and bitumen component, and more than 40% by weight of a filler, based on total weight of the block copolymer composition, bitumen component, and filler, which block copolymer composition comprises at least one block of a conjugated diene and at least two blocks of a monovinylaromatic hydrocarbon, wherein the block copolymer composition has a vinyl content of at least 25% by weight based on the total diene content and a diblock content of 25 wt % or less, and any diblock copolymer present has an apparent molecular weight which is in the range of from 60,000 to 170,000.

2. A shingle as claimed in claim 1, wherein the block copolymer composition has a vinyl content in the range of from 35 to 65% by weight.

3. A shingle as claimed in claim 2, wherein the block copolymer composition has a vinyl content in the range of from 35 to 55% by weight.

4. A shingle as claimed in claim 1, wherein any diblock copolymer present has an apparent molecular weight in the range of from 60,000 to 130,000.

5. A shingle as claimed in claim 1, wherein the block copolymer composition is present in an amount in the range of between 2 and 15% by weight, based on total weight of block copolymer composition and the bitumen component.

6. A shingle as claimed in claim 5, wherein the block copolymer composition is present in an amount in the range of between 5 and 15% by weight, based on total weight of block copolymer composition and the bitumen component.

7. A shingle as claimed in claim 6, wherein the block copolymer composition is present in an amount in the range of between 8 and 12% by weight, based on total weight of block copolymer composition and the bitumen component.

8. A shingle according to claim 1, wherein the bitumen component has a penetration in the range of from 10 to 300 units at 25° C. (as measured by ASTM D 5).

9. A shingle according to claim 8, wherein the bitumen component has a penetration in the range of from 50 to 200 units at 25° C. (as measured by ASTM D 5).

10. A shingle according to claim 1, wherein the filler is present in an amount in the range of 50 to 70% by weight, based on total weight of block copolymer composition, bitumen component, and filler.

* * * * *